US009262237B2

(12) United States Patent
Gopalraj et al.

(10) Patent No.: US 9,262,237 B2
(45) Date of Patent: Feb. 16, 2016

(54) AUTOMATING SOFTWARE AVAILABILITY MANAGEMENT BASED ON API VERSIONING

(71) Applicant: International Business Machines Corporation, Armonk, NY (US)

(72) Inventors: Ramajeyam Gopalraj, Morrisville, NC (US); David M. Wendt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/108,939

(22) Filed: Dec. 17, 2013

(65) Prior Publication Data
US 2015/0169386 A1 Jun. 18, 2015

(51) Int. Cl.
G06F 9/54 (2006.01)
G06F 9/44 (2006.01)
(52) U.S. Cl.
CPC . *G06F 9/541* (2013.01); *G06F 8/71* (2013.01)
(58) Field of Classification Search
None
See application file for complete search history.

(56) References Cited

U.S. PATENT DOCUMENTS

| 7,222,138 | B2 | 5/2007 | Fomenko |
| 7,610,316 | B2 | 10/2009 | Bartz et al. |
| 8,922,569 | B1* | 12/2014 | Tidd .............................. 345/522 |
| 2002/0174266 | A1 | 11/2002 | Palem et al. |
| 2003/0159135 | A1 | 8/2003 | Hiller et al. |
| 2005/0091187 | A1* | 4/2005 | Madhavarapu et al. .......... 707/1 |
| 2006/0080676 | A1* | 4/2006 | Colgrave ...................... 719/318 |
| 2008/0140857 | A1* | 6/2008 | Conner et al. ................ 709/236 |
| 2008/0201417 | A1* | 8/2008 | McCain et al. ............... 709/203 |
| 2009/0063584 | A1* | 3/2009 | Abzarian et al. ............. 707/203 |
| 2012/0131563 | A1* | 5/2012 | Das .............................. 717/168 |
| 2012/0144379 | A1 | 6/2012 | Tsai |
| 2012/0192155 | A1 | 7/2012 | Silbey et al. |

FOREIGN PATENT DOCUMENTS

JP 2011510388 T 3/2011
TW 201224814 A 6/2012

OTHER PUBLICATIONS

Gagnon, et al., "API Backward Compatibility Testing using VSTS", 2012 Ninth International Conference on Information Technology—New Generations, 978-0-7695-4654-4/12 $26 © 2012 IEEE, DOI 10.1109/ITNG.2012.40.

* cited by examiner

*Primary Examiner* — Tuan Dao
(74) *Attorney, Agent, or Firm* — Edward J. Wixted, III; Maeve McCarthy

(57) ABSTRACT

A method is disclosed for automating software availability management based on application program interface (API) versioning. The method includes receiving a call to a first version of an API method from a software application. The method includes retrieving software configuration information for the software application, the software configuration information including a set of supported versions of the API method. The method includes retrieving server configuration information for a server computing device, the server configuration information including a set of available versions of the API method. The method then includes determining availability of the server computing device to support the software application.

3 Claims, 4 Drawing Sheets

US 9,262,237 B2

AUTOMATING SOFTWARE AVAILABILITY MANAGEMENT BASED ON API VERSIONING

FIELD OF THE INVENTION

The present invention relates generally to the field of software development, and more particularly to software program development tools.

BACKGROUND OF THE INVENTION

An application programming interface (API) method specifies how some software components should interact with each other. An API method can be in the form of an API library, which is essentially a basic library consisting of interfaces, functions, classes, structures, enumerations, etc. for building a software application. An API library can also consist of specifications for routines, data structures, object classes, and variables. In other cases, an API method can come as just a specification of remote calls, allowing an application to cause a procedure to execute in another address space. API method and libraries are usually specific to a given technology: hence, the API methods of a given language cannot be used in other languages unless the function calls are wrapped with specific adaptation libraries. When clients and servers interact, they rely on pre-determined versions of API methods on the client application side and compatible API method versions in the API library on the server side. Often, the API versions in the API library are modified when changes are made on the server side. This leads to compatibility errors between client programs and server programs due to the versions required by the client not matching the versions available on the server. Compatibility errors require many changes to the client program to allow for software compatibility with the API library on the server.

SUMMARY

Embodiments of the present invention disclose a method, computer program product, and computer system for automating software availability management based on application program interface (API) versioning. In an embodiment, a computer processor receives a call to a first version of an API method from a software application. The computer processor retrieves software configuration information for the software application, the software configuration information including a set of supported versions of the API method. The computer processor then retrieves server configuration information for a server computing device, the server configuration information including a set of available versions of the API method. The computer processor then determines availability of the server computing device to support the software application.

DETAILED DESCRIPTION

Figure 1:
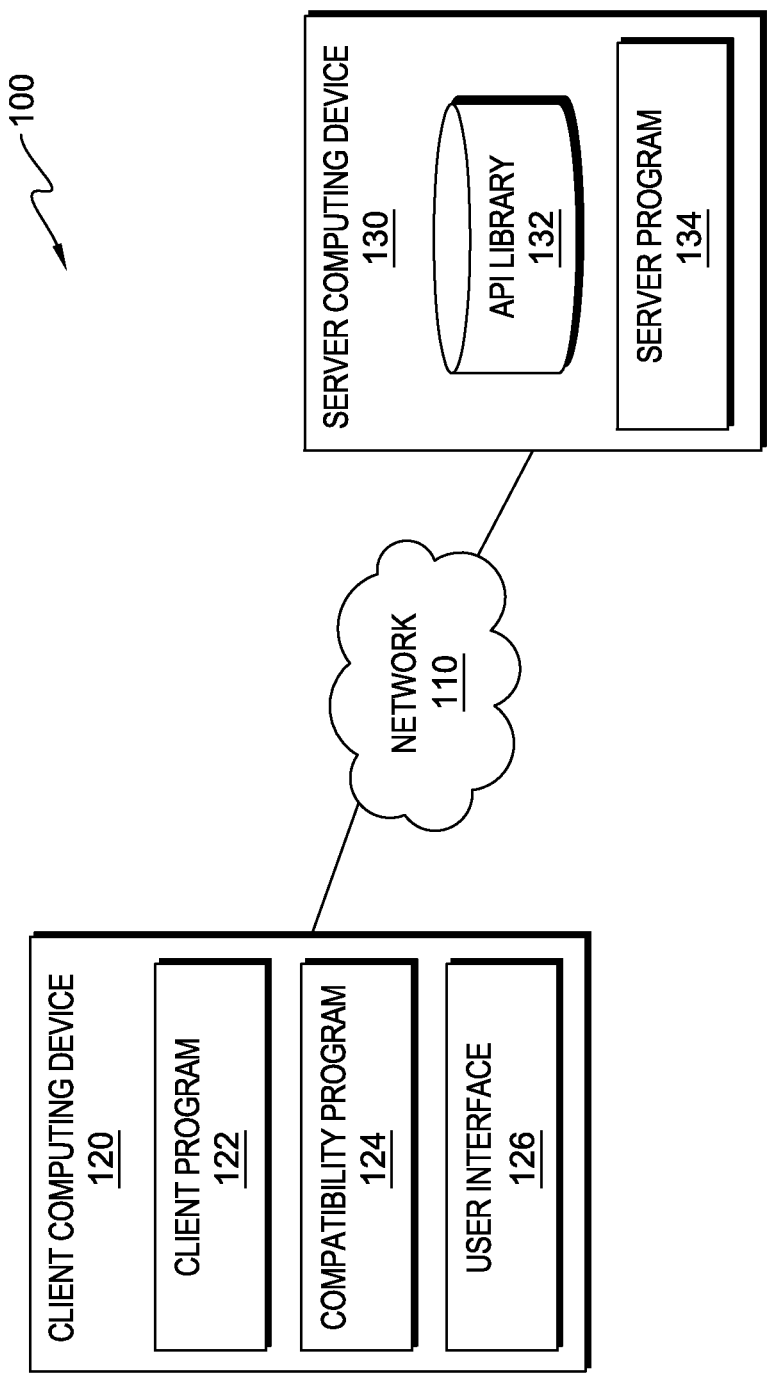
FIG. 1 is a functional block diagram illustrating a distributed data processing environment, in accordance with an embodiment of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system". Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Embodiments of the present invention recognize that when client and server software programs interact with each other, the programs rely on pre-defined APIs. When modifications are made to a server version of the software program, the API methods on the server may also be modified. These modifications lead to incompatibility between the client program and the server program because the changes to the server may not be communicated to the client program. Embodiments of the present invention recognize that being able to communicate required and available versions of API methods between client programs and server programs allows the client programs to automatically call a new version of an API method, when available. Additions or changes that are made to pre-existing APIs can be stored in a database on a server, such as in an API library.

The present invention will now be described in detail with reference to the Figures. FIG. 1 is a functional block diagram illustrating a distributed data processing environment, generally designated 100, in accordance with one embodiment of the present invention.

Distributed data processing environment 100 includes client computing device 120 and server computing device 130, all interconnected over network 110. Network 110 can be, for example, a local area network (LAN), a wide area network (WAN), such as the Internet, or a combination of the two, and can include wired, wireless, or fiber optic connections. In general, network 110 can be any combination of connections and protocols that will support communication between client computing device 120 and server computing device 130.

Client computing device 120 includes client program 122, compatibility program 124, and user interface (UI) 126. In various embodiments of the present invention, client computing device 120 can be a laptop computer, a personal digital assistant (PDA), a smart phone, or any programmable electronic device capable of communicating with server computing device 130 via network 110. Client program 122 can be any type of program on client computing device 120 that communicates with server computing device 130 through network 110. Client program 122 can be, for example, a software application, or a software component. UI 126 may be, for example, a graphical user interface (GUI) or a web user interface (WUI) and can display text, documents, web browser windows, user options, application interfaces, and instructions for operation. Client computing device 120 may include internal and external hardware components, as depicted and described in further detail with respect to FIG. 4.

Compatibility program 124 determines a version of an API method required by a client program, such as client program 122. Compatibility program 124 checks to see if there is a version of the required API method on a server, such as server computing device 130, that can support calls from corresponding client program 122. Calls from client program 122 confirm that an API library is installed and available on server computing device 130 that supports the required version of the API method. An API library, for example, API library 132 on server computing device 130, is installed and can contain older and newer versions of various API methods required by the client program 122. Server program 134 may modify or revise API methods, for example, by updating or changing the language for code writing for the client program 122. Compatibility program 124 communicates between client program 122 and server program 134 and receives configuration information for the client program 122 and the server program 134, such configuration information including, for the client program, required versions of API methods, and for the server program, supported versions of API methods and any alternative versions.

If compatibility program 124 determines server computing device 130 does not have an API library that supports the required version of the API method for client program 122, compatibility program 124 issues an error, for example, an error displayed on UI 126 to a user operating client computing device 120. While in FIG. 1, compatibility program 124 is included within client computing device 120, one of skill in the art will appreciate that in other embodiments, compatibility program 124 may be located elsewhere within distributed data processing environment 100 and can communicate with client computing device 120 and server computing device 130 via network 110.

Server computing device 130 includes API library 132 and server program 134. Server program 134 can be any type of program on server computing device 130 that communicates with client computing device 120 through network 110. Server program 134 can be, for example, a database or a communication program. Server program 134 may update or modify API methods contained in API library 132 that can be called by client program 122. Server program 134 may also create new versions of API methods. API library 132 contains versions of API methods that support client program 122. Server computing device 130 can be a laptop computer, a tablet computer, a netbook computer, a PC, a desktop computer, a PDA, a smart phone, or any programmable electronic device capable of communicating with client computing device 120 via network 110, and with other various components and devices within distributed data processing environment 100. In an embodiment of the present invention, server computing device 130 can represent a computing system utilizing clustered computers and components to act as a single pool of seamless resources when accessed through a network. This is a common implementation for data centers and for cloud computing applications.

Figure 2:
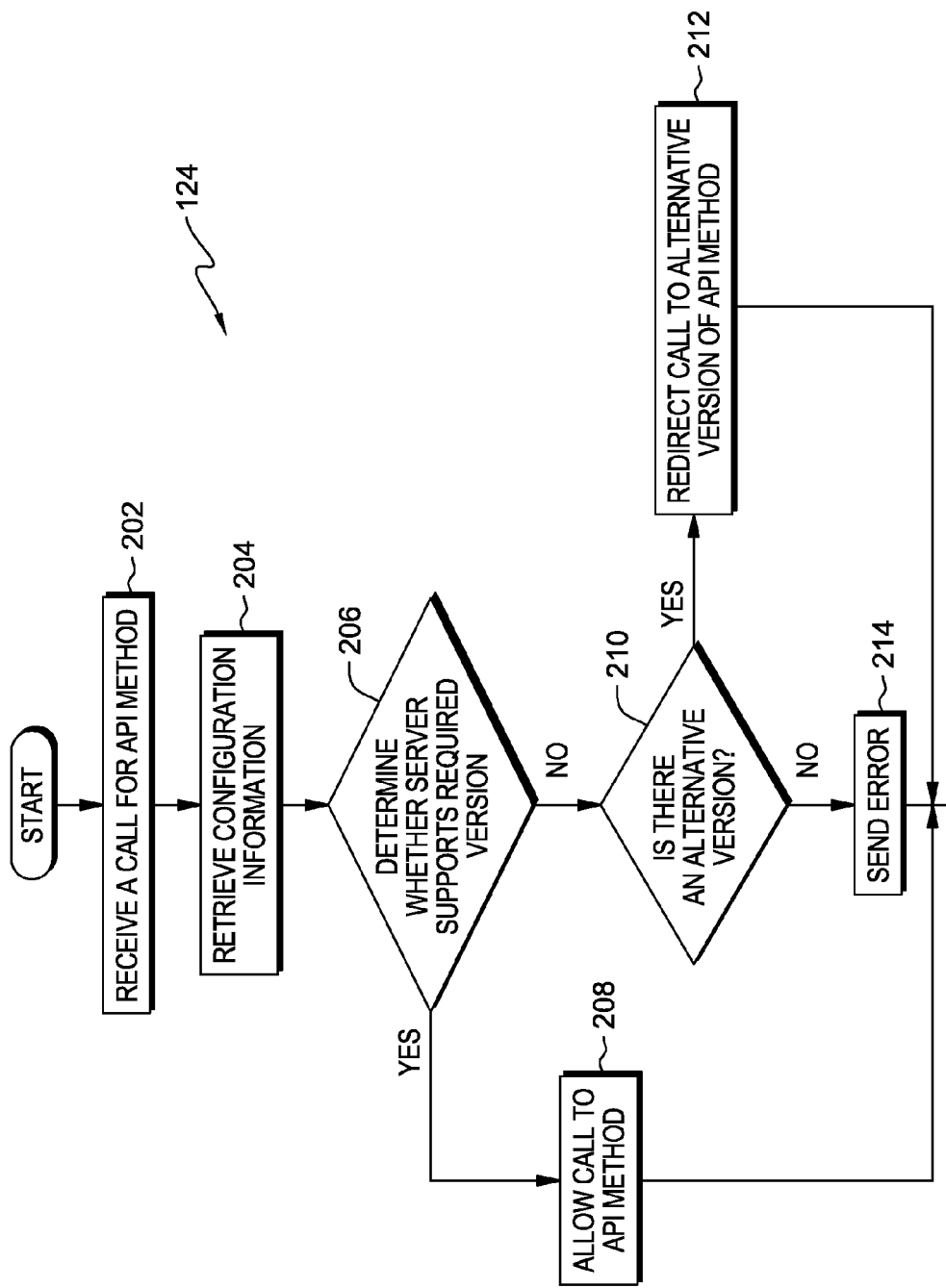
FIG. 2 is a flowchart depicting operational steps of a compatibility program for determining whether required versions of API methods for a client program are available or compatible with versions of API methods of a server program, in accordance with an embodiment of the present invention.

FIG. 2 is a flowchart depicting operational steps of compatibility program 124 for determining whether required versions of API methods for a client program are available or compatible with versions of API methods of a server program, in accordance with an embodiment of the present invention.

Compatibility program 124 receives a call for an API method (step 202). Client program 122 calls through compatibility program 124 to a required version of an API method on server computing device 130. An API method corresponds to a client program or software application, for example, client program 122, and each instance of client program 122 may call different versions of the API method.

Compatibility program 124 retrieves configuration information (step 204). Compatibility program 124 retrieves configuration information from client program 122, API library 132, and server program 134. Configuration information from client program 122 may include, for example, a set of required versions, or versions of API methods supported by client program 122. In an embodiment, software configuration information from client program 122 includes information mapping newer versions of API methods to previous alternative versions. Configuration information from API library 132 and server program 134 may include, for example, a set of available versions of API methods that support client program 122 and updates to API methods from server program 134. In another embodiment of the present invention, updates to API methods may also be created by a programmer. For example, the API method version required by client program 122 may be the current API version that the server still uses, it may be an old version that the server still has access to, or it may a version of an API method that is no longer available. Configuration information can further include a list of API versions that are supported by a given client program, such as client program 122, alternative versions for each API, and all API versions associated with a server program, such as server program 134. In an embodiment, server configuration information from server program 134 and API library 132 includes mapped information between related versions, including new and previous versions, of API methods.

Compatibility program 124 determines whether the server computing device is available to support client program 122, for example, whether API library 132 supports the required version of the API method (decision block 206). If API library 132 does support the required version (decision block 206, "yes" branch), which can be determined based on the server configuration information and the software configuration information, compatibility program 124 allows the call to the required version of the API method from client program 122 (step 208). If API library 132 does not support the required version (decision block 206, "no" branch), compatibility program 124 determines if there is an alternative version of the API method available in API library 132 (decision block 210).

Compatibility program 124 determines if there is an alternative version of the required API method (decision block 210). To determine if there is an alternative version of the required API version available on server computing device 130, compatibility program 124 checks the server program 134 configuration information to see if the server program 134 is newer than the client program. Compatibility program 124 can also check client program 122 configuration information to determine whether client program 122 is newer than the server program. In an embodiment, the configuration information contains mapped information, which maps a new version of the required API method to the old version. If compatibility program 124 determines, for example, the client program 122 is newer than the server program 134, the mapped information allows compatibility program 124 to determine if there is a compatible alternative version of the required API method available. If compatibility program 124 determines that there is an alternative version of the required API method available (decision block 210, "yes" branch), compatibility program 124 redirects the call to the alternative version of the API method (step 212). In an embodiment, compatibility program 124 requires marshalling the call by a translator to modify the received call to the required version of the API method to a call to the alternative version of the API method. If compatibility program 124 does not find an alternative version of the required API method (decision block 210, "no" branch), for example, the set of available versions of the API method does not support the required version of the API method, compatibility program 124 issues an error, for example, by sending an error message to a user on a UI such as UI 126 (step 214).

Figure 3:
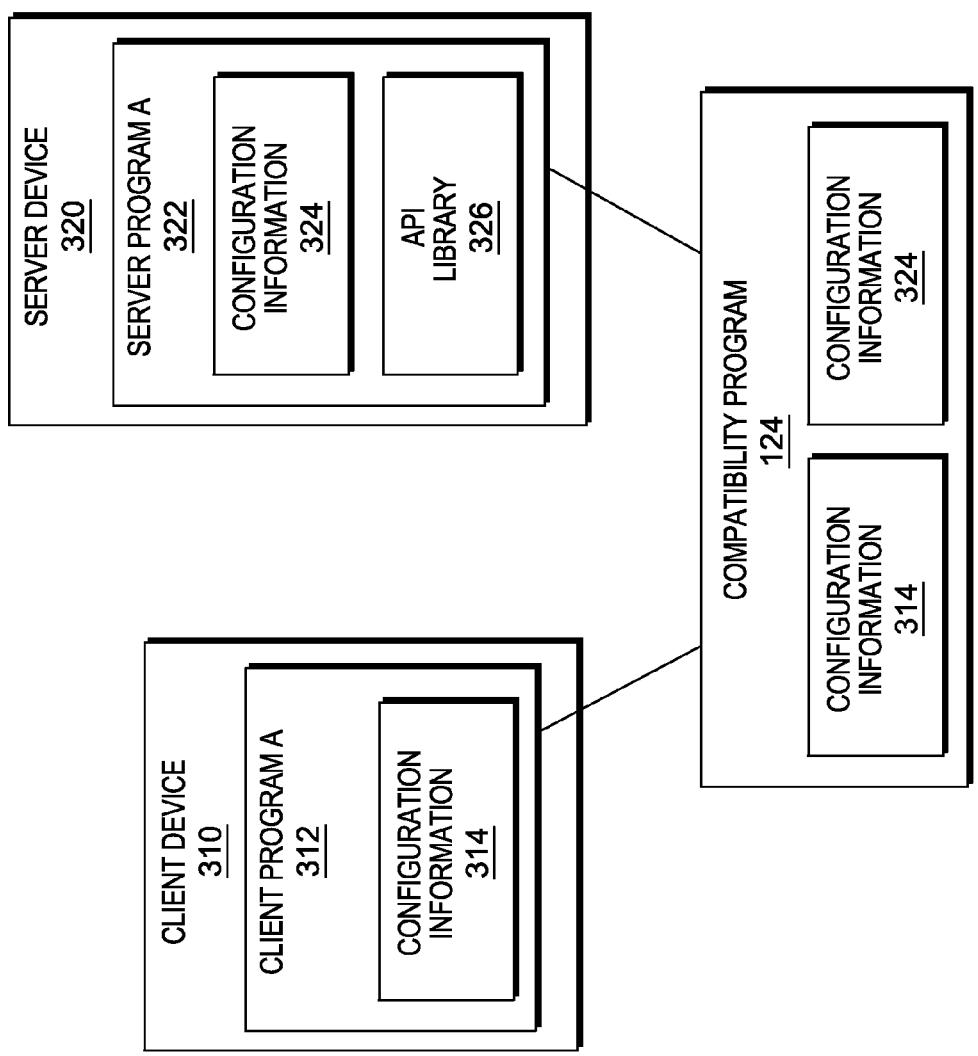
FIG. 3 illustrates an example of a server device and a client device communicating via the compatibility program of FIG. 2, in accordance with an embodiment of the present invention.

FIG. 3 illustrates an example of a server device and a client device communicating via compatibility program 124, in accordance with an exemplary embodiment of the present invention.

In the exemplary embodiment depicted in FIG. 3, client device 310 contains client program A 312, and configuration information 314. Server device 320 contains server program A 322, configuration information 324, and API library 326. Both client program A 312 and server program A 322 are able to communicate via compatibility program 124. Compatibility program 124 may reside on client device 310, server device 320, or may reside elsewhere and be accessible to both client device 310 and server device 320 via a network. Configuration information 314 includes required versions of API methods for client program A, and configuration information 324 includes available versions of API methods for corresponding server program A. Compatibility program 124 retrieves configuration information 314 and configuration information 324 from client program A and server program A, respectively.

In an example, a required version of an API method is defined within configuration information 314 for client program A 312. Configuration information 314 defines the API method including parameters and data-types. Once a client program, such as client program A 312, is shipped, changes to API interfaces or API behavior on the server, such as server device 320, may cause the client program to no longer work. Each new API version created, and each API version revised, is stored within API library 326 on server program A 322. In an exemplary embodiment of the present invention, the new API versions can be created by a programmer. Compatibility program 124 can retrieve configuration information 314 and configuration information 324 and communicate with both client program A 312 and server program A 322 to determine which versions of API methods are compatible with client program A 312, and which versions of API methods are available in API library 326.

Figure 4:
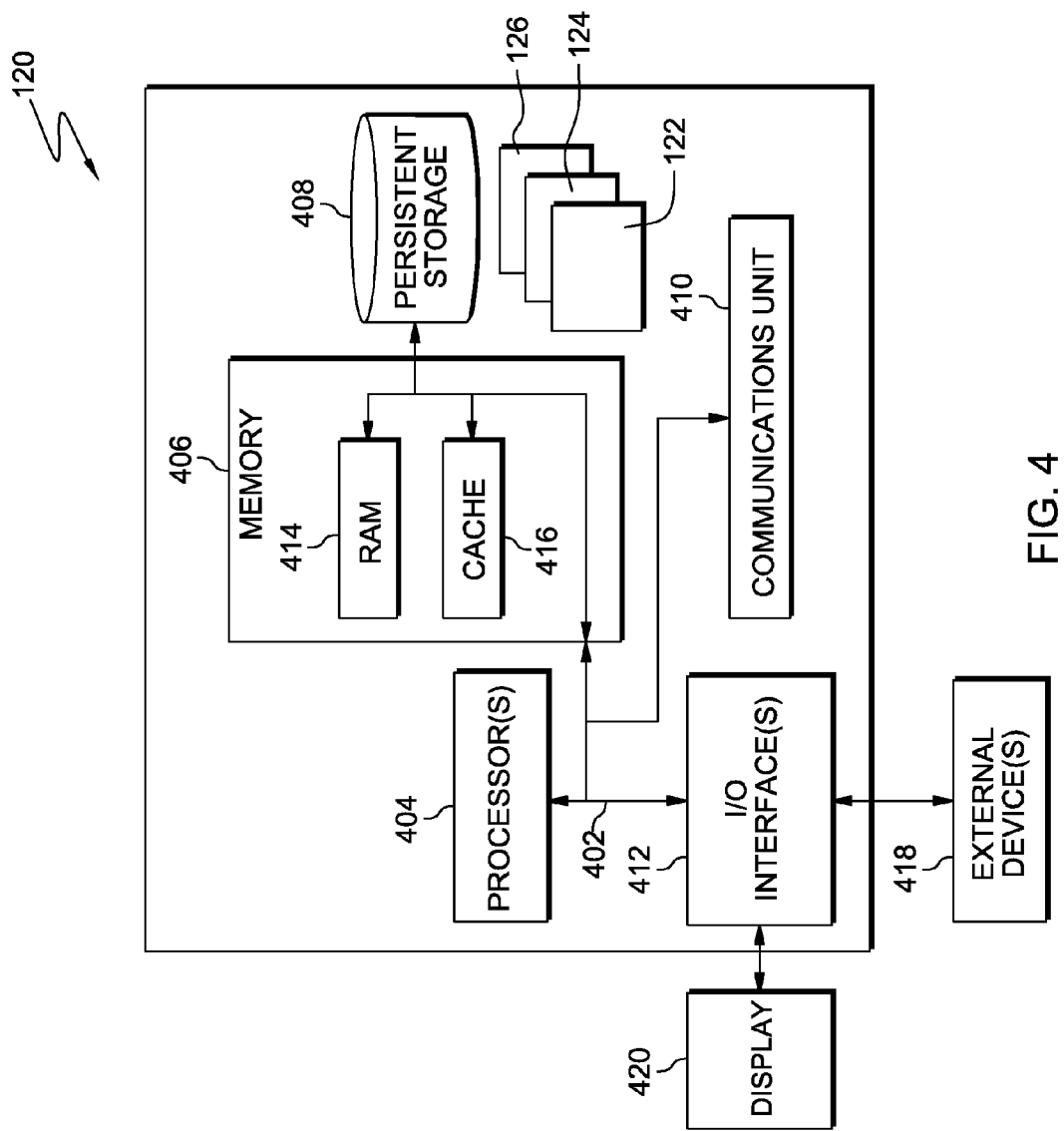
FIG. 4 depicts a block diagram of components of the client computing device of FIG. 1, in accordance with an embodiment of the present invention.

FIG. 4 depicts a block diagram of components of client computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Client program 122, compatibility program 124, and UI 126 can be stored in persistent storage 408 for execution by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including between client computing device 120 and server computing device 130. In these examples, communications unit 410 includes one or more network interface cards. Communications unit 410 may provide communications through the use of either or both physical and wireless communications links. Client program 122 and compatibility program 124 may be downloaded to persistent storage 408 through communications unit 410.

I/O interface(s) 412 allows for input and output of data with other devices that may be connected to client computing device 120. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., client program 122, compatibility program 124, and UI 126, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for automating software availability management based on application program interface (API) versioning, the method comprising the actions of:

receiving, by one or more computer processors, a call to a first version of an API method from a software application;

retrieving, by the one or more computer processors, configuration information, the configuration information including a predetermined set of supported versions of the API method, API versions available on a server computing device, and mapped information between related versions, including new and previous versions, of API methods;

determining, by the one or more computer processors, that the API versions available on the server computing device do not include the first version of the API method;

determining, by the one or more computer processors, that the API versions available on the server computing device include a second version of the API method based on, at least, the mapped information between related versions of API methods; and directing, by the one or more computer processors, the call to the second version of the API method, wherein the directing of the call to the second version of the API method is marshaled by a translator.

2. A computer program product for automating software availability management based on application program interface (API) versioning, the computer program product comprising:

one or more computer-readable storage devices and program instructions stored on the one or more computer-readable storage devices, the program instructions comprising:

program instructions to receive a call to a first version of an API method from a software application;

program instructions to retrieve configuration information, the configuration information including a predetermined set of supported versions of the API method, API versions available on a server computing device, and mapped information between related versions, including new and previous versions, of API methods;

program instructions to determine that the API versions available on the server computing device do not include the first version of the API method;

program instructions to determine that the API versions available on the server computing device include a second version of the API method based on, at least, the mapped information between related versions of API methods; and program instructions to direct the call to the second version of the API method, wherein the directing of the call to the second version of the API method is marshaled by a translator.

3. A computer system for automating software availability management based on application program interface (API) versioning, the computer system comprising:

one or more computer processors;

one or more computer-readable storage devices; and program instructions stored on the one or more computer-readable storage devices for execution by at least one of the one or more computer processors, the program instructions comprising:

program instructions to receive a call to a first version of an API method from a software application;

program instructions to retrieve configuration information, the configuration information including a predetermined set of supported versions of the API method, API versions available on a server computing device, and mapped information between related versions, including new and previous versions, of API methods;

program instructions to determine that the API versions available on the server computing device do not include the first version of the API method;

program instructions to determine that the API versions available on the server computing device include a second version of the API method based on, at least, the mapped information between related versions of API methods; and program instructions to direct the call to the second version of the API method, wherein the directing of the call to the second version of the API method is marshaled by a translator.

\* \* \* \* \*